W. LE R. BRYANT.
CHUCK.
APPLICATION FILED OCT. 22, 1910.
1,075,756.
Patented Oct. 14, 1913.
2 SHEETS—SHEET 1.
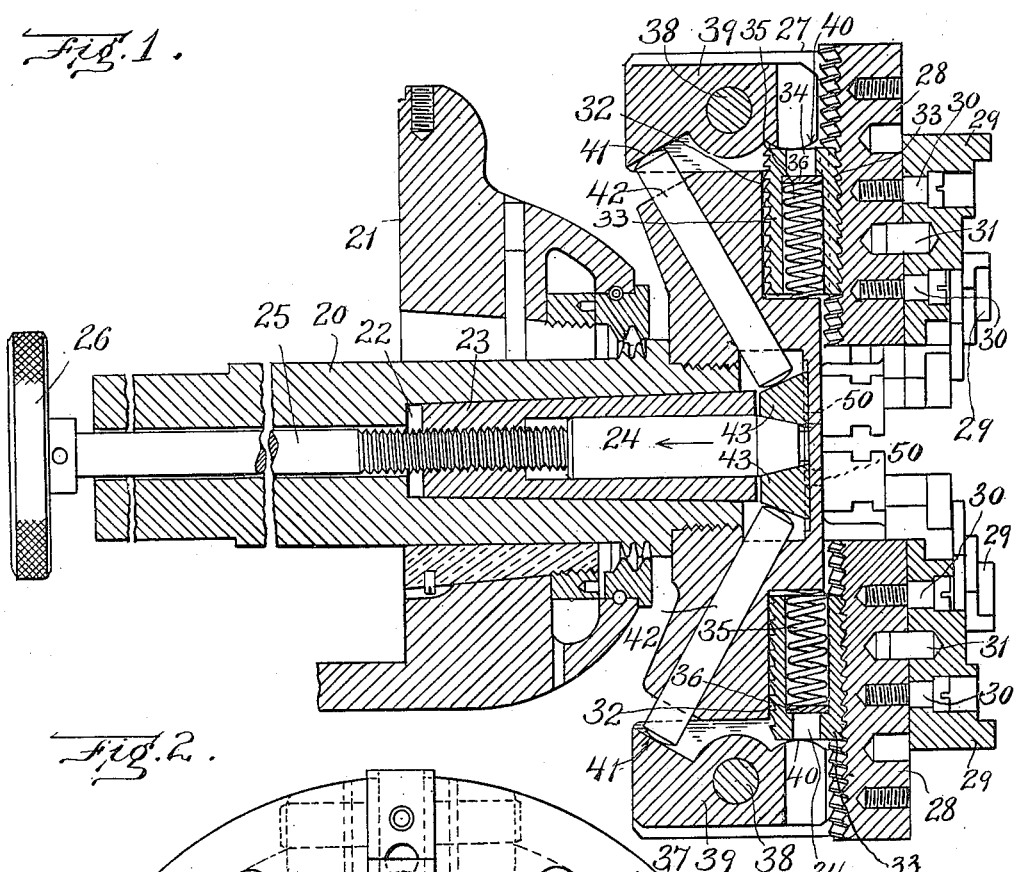
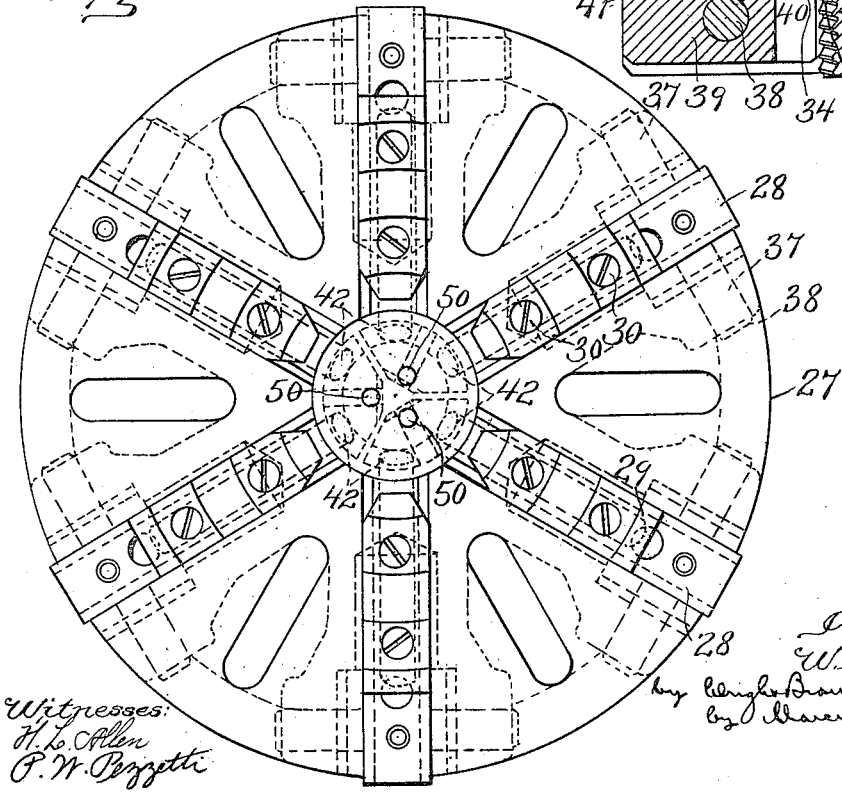

W. LE R. BRYANT.
CHUCK.
APPLICATION FILED OCT. 22, 1910.
1,075,756.
Patented Oct. 14, 1913.
2 SHEETS—SHEET 2.
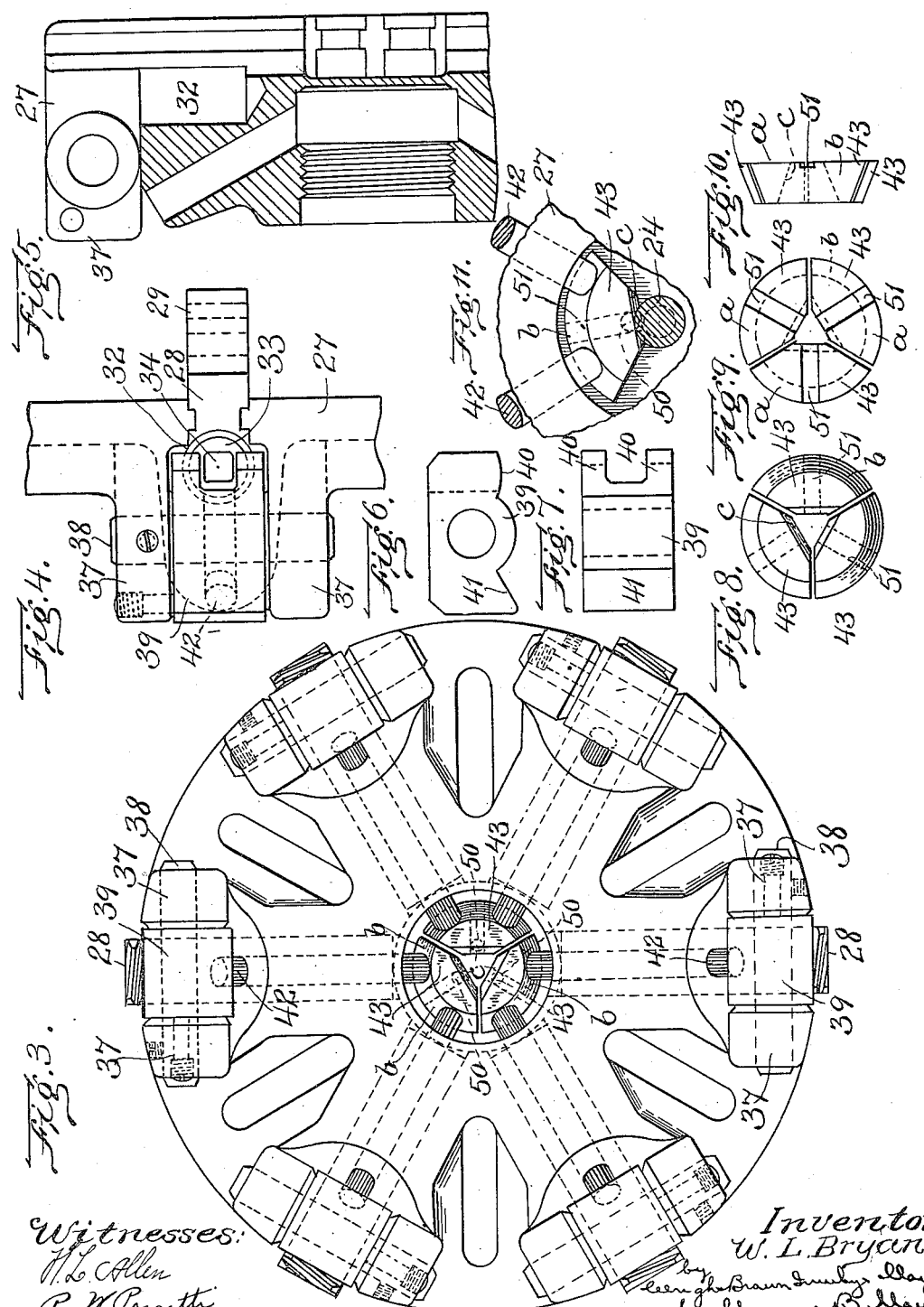

UNITED STATES PATENT OFFICE.

WILLIAM LE ROY BRYANT, OF SPRINGFIELD, VERMONT.

CHUCK.

1,075,756.

Specification of Letters Patent.

Patented Oct. 14, 1913.

Application filed October 22, 1910. Serial No. 588,427.

*To all whom it may concern:*

Be it known that I, WILLIAM LE ROY BRYANT, a citizen of the United States, of Springfield, in the county of Windsor and State of Vermont, have invented certain new and useful Improvements in Chucks, of which the following is a specification.

This invention has relation to chucks for holding metal during the operation of turning or grinding.

In modern practice, a bar or other piece of metal is turned to approximately the diameter or diameters desired, and in many cases is then subjected to a hardening process. Such pieces of metal thus turned, or turned and hardened, are then ground accurately to the desired diameter. Both in turning and in grinding it is practically impossible to rechuck the work; that is to say, after placing it in the chuck and subjecting it to one operation, it is exceedingly difficult to replace it in the chuck for a second operation without an error due to the inaccuracies in the periphery of the work, especially where the work has been hardened. Where the work is to be finished, as by fine turning or by grinding, it is highly desirable, if not essential, that the work should be centered as accurately as possible with reference to the axis of the chuck and without loss of time. Heretofore it has been practically the universal custom to provide the chuck with a plurality of jaws to take bearing on the periphery of the work, and to move these jaws simultaneously toward the center. Where this is done, however, it is quite apparent that some of the jaws will engage the work while others will not, except in the case of the three-jawed chucks. In the former case, the jaws are adjustable independently of each other in order to secure a bearing of all of the jaws upon the work. In both cases, however, it has been impossible as a practical matter to center the work without the expenditure of a great deal of time on the part of the operator, and, as a result, an excessive amount of metal is necessarily removed in order that the finished work may be concentric with the axis upon which it is rotated.

The object of the present invention is to provide a chuck in which I obviate, to a great extent, error in centering the work due to inequalities in the periphery of the work itself, and enable the operator to operate the jaws simultaneously. This I accomplish by arranging the jaws in pairs and employing for each pair an equalizer movable about a point or fulcrum at which power is applied to the equalizer, so that the two jaws of the pair will have a differential movement whereby both will be caused to bear equally upon the periphery of the work. For instance, where six jaws are employed, arranged in three pairs, the jaws of each pair being operated by an equalizer, I secure a general average of engagement of the jaws with the work which more quickly and accurately approximates a circle about the center of the work than has heretofore been possible. The equalizers are operated simultaneously to move the jaws into engagement with the work, the equalizers, as stated, being capable of a rocking motion approximately about the point where the force is applied to operate them. I provide in this way what I term a three-point bearing; that is to say, a point on which the equalizer bears and about which it is adapted to rock, and separate points at which the jaws bear either directly or through the medium of some power-transmitting device, so that all the jaws bear with substantially equal pressure upon the periphery of the work.

I have illustrated the invention as being embodied in a six-jaw chuck with an equalizer for each pair of jaws and means actuated by a controller for simultaneously operating the equalizers, but it will be understood that the invention is not limited to any particular number of jaws and that it may well be embodied in a chuck having a greater or smaller number of jaws, it being understood of course that the jaws should always be arranged in pairs so that there will be an even number of them. In illustrating the invention, I have also shown a certain feature of improvement, to wit, the specific means for transmitting power from the equalizers to the jaws to effect movement of the latter, and certain other features, all of which are described in the accompanying specification and pointed out in the appended claims.

Referring to the drawings, Figure 1 represents in longitudinal section a six-jaw chuck embodying the invention. Fig. 2 represents a front elevation of the same. Fig. 3 represents a rear elevation of the chuck with the spindle and controller removed. Fig. 4 represents a top view of a portion of the chuck and illustrates one of the jaws and the rocker. Fig. 5 illustrates a section through the chuck body. Figs. 6 and 7 illustrate one of the rockers. Figs. 8, 9 and 10 represent respectively a rear elevation, a front elevation and a side view of the equalizers. Fig. 11 is in the nature of a diagrammatic view to illustrate the operation of the equalizer, and shows the controller, an equalizer, and two of the pins which transmit power from the equalizer to the jaws operated by the equalizer.

On the drawings, 20 indicates a spindle which may be of any desired type or design such as utilized in lathes or grinding machines, and to which the chuck body is attached in any desirable way. It is mounted in suitable bearings, of which one is illustrated at 21. The details of mounting the spindle are unessential and form no part of the present invention. In the end of the spindle there is a slightly tapered recess 22 in which is inserted a bushing 23 socketed to receive a slidable controller 24 which consists of a cylindrical pin having a frusto-conical or tapered projecting outer end, its axis being coincident with the axis of rotation of the spindle and chuck. Against the inner end of the controller bears a screw bar 25 equipped with a hand wheel 26 by which it may be rotated to move the controller longitudinally of the spindle. Of course it will be understood that in lieu of the specific form of controller and of the screw bar for operating it, I may utilize any other mechanism that is convenient or desirable.

The chuck body is indicated at 27 and in its face it has radial guideways for the reception of a plurality of slides indicated at 28. The guideways have tongues taking in the grooves in the sides of the slides as ordinarily. A shouldered jaw 29 is secured to the front of each slide by any suitable fastening devices, such, for instance, as shouldered screws 30 and dowels 31 which are utilized to accurately locate the jaws upon the slides. As illustrated, each slide is provided with three threaded apertures for the reception of the screws and with two apertures for the reception of the dowel, so that the jaw is capable of adjustment to two different positions on the slide. In the rear of each guideway there is a radial socket 32 for the reception of adjusting screws 33. Each screw, as shown, is exteriorly threaded and engages complemental threads on the inner face of its adjacent slide, and it is formed at its end with a polygonal aperture 34 into which a tool may be inserted, whereby it may be rotated to effect an independent adjustment of the slide and jaw with which it is associated. It will be observed that each adjusting screw is hollow for the reception of a strong helical spring 35, one end of which bears against the chuck body, and the other end of which bears against the end of the socket in the screw so that its tendency is to force the screw outwardly. As a matter of detail, there is inserted in the socket in each screw a bearing plate or disk 36. The chuck body is provided with a plurality of pairs of lugs 37 in its rear, and journaled upon pintles 38 passed through said lugs are levers or rockers 39. These rockers are illustrated in detail in Fig. 6, each rocker being provided with a convex surface 40 which bears upon the end of one of the adjusting screws 33. By swinging the rockers about their fulcrums or axes, the adjusting screws and their associated slides and jaws may be moved radially inward toward the axis of the chuck. The rear ends of the rockers are provided with surfaces 41 which bear upon the ends of pins 42, as best shown in Fig. 1. These pins are arranged radially of said axis of the chuck and are also inclined with respect to said axis. Their outer ends approximate a circle about the axis of the chuck. For sliding each pair of pins outwardly to operate the associated rockers and move the chuck jaws inwardly, I utilize, what I term, an equalizer. Where there are six jaws and consequently six pins, I employ three equalizers, and, as illustrated, they take the form of segments 43 which are arranged in a recess in the chuck body between it and the end of the spindle. When the segments are assembled, as shown in Fig. 3, they approximate a frusto-cone with an approximately triangular tapered bore into which the tapered end of the controller projects. Taking each segment by itself, it is provided with a flat front face *a* which bears against the flat face of the chuck body, and a tapering convex outer surface *b* against which bear, at two separated points, the ends of two of the pins 42. It is also provided with an inner beveled face *c* which midway between its ends rests upon and is adapted to rock about the beveled end of the controller 24. By moving the controller longitudinally of its axis, the equalizers may be all bodily moved outward radially of said axis, while at the same time each equalizer is adapted to rock about its point of engagement with the controller. The several equalizers are held against rotation with respect to the chuck body by pins 50 passed through said chuck body and entering grooves 51 in the faces *a* of said equalizer.

The springs 35 perform two functions. They thrust the jaws radially outward to inactive position when the controller 24 is withdrawn or moved to the left, and at the same time they bear with sufficient force upon the adjusting screws 33 so as to insure at all times the positive engagement of said screws with the rockers, of the rockers with the pins 42, of the pins with the equalizers, and of the equalizers with the controller; and their force is sufficient, by reason of the taper of the end of the controller and the bevel of the equalizers, to move the controller to the left when the screw bar 25 is rotated to withdraw it.

In Fig. 11, I have illustrated diagrammatically one of the rockers, the controller and the pins which bear against the rocker. From this figure, it will be apparent that the equalizer is capable of rocking about the point with which it is engaged by the controller when it is moved radially outwardly by the controller so that one of the pins may be moved to a greater distance than the other. The result of this construction is that, when the controller is moved to the right, or toward active position, the jaws will have a differential movement, some of the jaws being moved to a greater extent than the others, so as to compensate for inequalities in the periphery in the work and secure a practically uniform bearing of all the jaws upon the work, and thus bring the axis of the work with accuracy into alinement with the axis of the chuck. Comparing a chuck of this nature with a three-jaw chuck in which the jaws are all moved simultaneously into engagement with the work, as are the jaws in the present case, it is plain that in the case of the three-jawed chuck the position of the work with reference to the chuck is determined solely by the engagement of three points with the work and that consequently, if the periphery of the work is not true, the center of the work will not coincide with the center of the chuck unless each jaw be independently adjusted with reference to the others. With a construction such as herein illustrated, however, although the jaws are all moved simultaneously with reference to the work, yet their movement is not necessarily to the same extent, those jaws which first engage the work stopping their movement and the other jaws continuing their movement until they likewise engage the work. This divides the error, as it were, for it multiplies the points of engagement of the jaws with the work and the general average of these points of engagement closely approximates a true cylinder whose axis is coincident with the axis of the chuck, and consequently the work is centered with accuracy and without loss of time. Another important result which is secured is that the work is always engaged by chuck jaws at more than three points in its periphery without the necessity of adjusting any one of the jaws; or, in other words, I am able to secure the automatic engagement of more than three jaws with the work without independent adjustment of any of them, this being accomplished automatically and merely by the operation of the controller. Each jaw is independently adjustable, however, for a maximum distortion of the work, and also for enabling the adjustment of the jaws for pieces of work of different diameters. By increasing the extent of movement of the various parts or elements or varying their relative proportions, the differential movement of the jaws may be made such that they will grasp and bear equally upon the exterior surface of an article of quite irregular outline.

On the drawing, the jaws are all shown as having been forced inward so as to engage the work, and, in order to release them from the work, it is merely necessary to rotate the screw so as to withdraw it and permit the movement of the controller to the left to inactive position.

Having thus explained the nature of my said invention, and described a way of making and using the same, although without attempting to set forth all of the forms in which it may be made or all of the modes of its use, what I claim is:

1. In a chuck, a rotatable chuck body, a pair of independent radially movable jaws, an equalizer for transmitting power at separated points to said jaws respectively, and means for transmitting power to said equalizer at a point between said points.

2. In a chuck, a pair of independent radially movable jaws, an equalizer adapted to rock about a fulcrum for transmitting differential movement to said jaws at points separated from its fulcrum, and means for transmitting power to said equalizer substantially at its fulcruming point to move said equalizer bodily, and thereby move said jaws.

3. In a chuck, a chuck body, a plurality of pairs of independent radially movable jaws, and means for moving the jaws into engagement with the work, comprising a plurality of rocking equalizers movable bodily thereby and arranged about a common center, each equalizer being arranged to effect the operation of both jaws of a pair, and means for actuating said equalizers.

4. In a chuck, a chuck body, a plurality of pairs of independently movable jaws arranged to move radially of said chuck body, a rocking equalizer for each pair of jaws, and a controller for simultaneously actuating all of said equalizers and thereby effecting the simultaneous differential actuation of all of said jaws.

5. In a chuck, a chuck body, a plurality of pairs of independently movable radial jaws, an equalizer for each pair of jaws, intermediate power-transmitting devices engaged with each equalizer at separated points for transmitting power to the respective jaws of the associated pair, and means for simultaneously moving said equalizers, while permitting them to rock to equalize the pressure on the jaws.

6. In a chuck, a controller, a plurality of equalizers arranged about a common center and fulcrumed on said controller, a pair of radial independently movable jaws connected with each equalizer at points on either side of its fulcrum, and means for actuating said controller to move said equalizers bodily and simultaneously.

7. In a chuck, a tapering controller, a plurality of segmental equalizers, each having an inner beveled face fulcrumed on the controller, a pair of radial jaws associated with each equalizer and operated thereby at points distant from its fulcruming point, whereby said jaws may be moved differential distances when said equalizer is actuated, and means for moving said controller longitudinally to actuate said equalizers.

8. In a chuck, a chuck body having radial guideways, a tapering controller, a plurality of radially movable elements with beveled inner faces engaged with said tapering controller, a plurality of radial jaws arranged to slide rectilinearly in said guideways, pivoted rockers for actuating said jaws, means for adjusting each jaw relatively to its actuating rocker, and positive power-transmitting means between said rockers and said elements.

9. In a chuck, a chuck body, radial slides having jaws, rockers pivoted to the chuck body and associated with said slides to operate them, slidable pins for actuating said rockers, and means for simultaneously operating said pins.

10. In a chuck, a rotatable chuck body, a plurality of independent radially movable jaws arranged in substantially a circle at the front face of the chuck body to engage the exterior of the work, a controller, and positive equalizing power-transmitting mechanisms associated with said jaws and operated by said controller for simultaneously imparting to said jaws a differential radial movement whereby they may grasp an irregular body with substantially equal positive pressure.

11. In a chuck, a rotatable chuck body, a plurality of pairs of independently movable jaws arranged radially on the chuck body, a controller, and mechanism comprising an equalizer associated with the jaws of each pair and located between said jaws and said controller, and actuated by said controller for imparting a positive simultaneous differential movement to said jaws.

In testimony whereof I have affixed my signature, in presence of two witnesses.

WILLIAM LE ROY BRYANT.

Witnesses:
H. L. ALLEN,
P. W. PEZZETTI.

Copies of this patent may be obtained for five cents each, by addressing the "Commissioner of Patents, Washington, D. C."